(12) United States Patent
Hagedoorn et al.

(10) Patent No.: US 8,561,479 B2
(45) Date of Patent: Oct. 22, 2013

(54) CORIOLIS FLOW SENSOR

(75) Inventors: Wouter Hagedoorn, Deventer (NL); Christian Johan Nieuwenhuis, Enschede (NL); Andre Johannes Maria Hilderink, Haaksbergen (NL); Marcel Ronald Katerberg, Deventer (NL); Jan Wouter van de Geest, Zutphen (NL)

(73) Assignee: Berkin B.V., Ruurlo (NL)

( * ) Notice: Subject to any disclaimer, the term of this patent is extended or adjusted under 35 U.S.C. 154(b) by 147 days.

(21) Appl. No.: 13/160,887

(22) Filed: Jun. 15, 2011

(65) Prior Publication Data
US 2011/0308329 A1 Dec. 22, 2011

(30) Foreign Application Priority Data

Jun. 16, 2010 (NL) ...................................... 1038047

(51) Int. Cl.
*G01F 1/84* (2006.01)
(52) U.S. Cl.
USPC .................................................... 73/861.355
(58) Field of Classification Search
USPC ........................................... 73/861.355–357
See application file for complete search history.

(56) References Cited

U.S. PATENT DOCUMENTS

| 5,020,380 | A | | 6/1991 | Keita |
| 5,259,250 | A | | 11/1993 | Kolpak |
| 6,450,042 | B1 | * | 9/2002 | Lanham et al. .......... 73/861.357 |
| 6,776,053 | B2 | * | 8/2004 | Schlosser et al. ........ 73/861.355 |
| 7,628,083 | B2 | * | 12/2009 | Lanham et al. .......... 73/861.355 |
| 2007/0034019 | A1 | | 2/2007 | Doihara et al. |

FOREIGN PATENT DOCUMENTS

| EP | 1 719 982 A1 | 11/2006 |
| EP | 1 726 921 A1 | 11/2006 |
| EP | 1 923 675 A1 | 5/2008 |
| EP | 2 199 756 A1 | 6/2010 |

OTHER PUBLICATIONS

Dutch Search Report, dated Jan. 27, 2011, from corresponding Dutch application.

* cited by examiner

*Primary Examiner* — Jewel V Thompson
(74) *Attorney, Agent, or Firm* — Young & Thompson

(57) ABSTRACT

A Coriolis flow sensor including a loop-shaped Coriolis tube mounted in a housing with two ends lying next to one another, the ends being fixed in a fixation element, while the portion of the tube located between the ends lies free from the housing, which flow sensor includes an excitation element for causing the tube to oscillate about an excitation axis as well as a detection element for detecting displacements of portions of the tube during operation. The tube is connected through the fixation element to a balancing member, the assembly of the balancing member and the tube being resiliently arranged with respect to the housing, while the excitation element are arranged to rotate the tube and the balancing member with counter-phase about the excitation axis.

14 Claims, 8 Drawing Sheets

CORIOLIS FLOW SENSOR

BACKGROUND OF THE INVENTION

1. Field of the Invention

The invention relates to a Coriolis flow sensor comprising a loop-shaped Coriolis tube mounted in a housing with two ends lying next to one another, said ends being fixed in a tube fixation means, while the portion of the tube located between said ends lies free from the housing, which flow sensor comprises excitation means for causing the tube to oscillate about an excitation axis as well as detection means for detecting displacements of portions of the tube during operation.

2. Description of the Related Art

Such a flow sensor having a loop-shaped Coriolis tube is known from EP 1 719 982 A1. Various types of loop-shaped Coriolis tubes are described therein, both of the single loop type and of the (continuous) double loop type. The present invention relates to any of these types, but is not restricted thereto.

A Coriolis flow sensor (or Coriolis flow sensor system) comprises at least one vibrating tube, often denoted Coriolis tube, flow tube, or sensing tube. This tube or these tubes is or are fastened at both ends to the housing of the instrument. These tube ends serve at the same time as feed and discharge ducts for the liquid or gas flow to be measured.

Besides the flow tube (or tubes), a Coriolis flow sensor comprises two further subsystems, i.e. one for excitation and one for detection. The excitation system (exciter) brings the tube into vibration. For this purpose, one or several forces or torques are applied to portions of the tube. The detection system usually detects the displacements of one or several points of the tube as a function of time. Instead of this displacement, the force (or torque) exerted by the tube on its environment may alternatively be measured; what will be described below with reference to displacement detection is equally valid for force detection.

The same two placement alternatives are possible for excitation and detection. One is to have the excitation and detection take place between the housing and the tube. The other one is to have the excitation or detection take place between different points or sections of the moving flow tube or—if the instrument has several tubes—between the individual tubes.

In the case of a Coriolis flow sensor (also referred to as "the (sensor) instrument" or "the flowmeter" hereinafter) designed for measuring small flows, it is desirable for the entire tube to lie in one plane both for the purpose of the measuring accuracy and for the purpose of ease of manufacture.

The vibration of the tube generated by the exciter takes place at a more or less fixed frequency which varies slightly only as a function of the density of the medium flowing through the tube. The vibration frequency is almost always a natural frequency of the tube so that a maximum amplitude can be achieved with a minimum energy input.

The invention is based on the recognition that two vibration problems may arise as a result of the vibration of the tube if no additional measures are taken.

The first problem may arise when two identical instruments are located close to one another while their vibration frequencies substantially coincide. One instrument may then excite the other instrument via the housing and the supporting surface, in general just outside its natural frequency, with a phase that will practically always differ from that of its own excitation. This is a real problem, because in practice, for example in mixing processes, two, three, or sometimes up to twenty flowmeters are arranged next to one another. It is found then that the measuring results can vary with a certain periodicity independently of the flow.

A second problem is the sensitivity to own vibrations: when a Coriolis flowmeter is placed on a non-rigid surface, for example a thin plate, or in a system of ducts, said surface may start to vibrate along with the flowmeter. The own vibrations are seen as shifts in the zero point. The accuracy of the sensor, and thus of the measurement, is influenced thereby in an unpredictable manner.

BRIEF SUMMARY OF THE INVENTION

It is an object of the invention to reduce the sensitivity to vibrations of a Coriolis flow sensor, especially of Coriolis flow sensors of the type wherein detection (and excitation) take place with respect to the housing. It is a particular object to reduce the sensitivity of the sensor instrument to its own vibrations or to vibrations of adjoining flow sensor instruments.

This object is achieved in a Coriolis flow sensor of the kind described in the opening paragraph in that the tube through the tube fixation means is connected to a balancing member, in that the assembly of the balancing member and the tube is resiliently arranged with respect to the housing, and in that the excitation means are arranged for rotating the tube about the excitation axis in counter-phase with the balancing member.

Measurements have shown inter alia that the resilient mounting of the Coriolis tube as described herein reduces the transfer of vibrations from a Coriolis tube to the housing during operation, and that a first instrument provided with this resilient mounting interferes with a second instrument located in the vicinity thereof to a lesser extent. At the same time there is a reduced sensitivity to external vibrations, which accordingly leads to an improved accuracy of a lone flow sensor with a resiliently mounted Coriolis tube. Should external means be used for the excitation, however, for example Lorentz excitation means as described in EP 1 719 982 A1, where an alternating current is passed through the tube and the tube is placed in the field of an external permanent magnet yoke that is fastened to the housing, then it is still possible for forces to be exerted on the housing via the magnet yoke during operation.

This is prevented according to the invention in that the excitation means are "internal" and are connected, directly, or indirectly, to the tube fixation means, but are not connected to the housing.

In a preferred embodiment, the tube fixation means is characterized in that it is of a bipartite construction comprising a first and a second fixation sub-means, said first fixation sub-means being connected to the balancing member while the tube ends are fixed in said second fixation sub-means, which fixation sub-means are moveably interconnected, and the excitation means are designed for causing the second fixation sub-means to pivot relative to the first fixation sub-means about the excitation axis.

In particular, the two parts are moveable (pivotable) relative to one another through actuation of a first and a second piezoelectric actuator arranged between the parts. In a preferred embodiment, the first and the second piezoelectric actuator are connected to a trigger device so as to be controlled by respective sinusoidal signals in counter-phase.

In a further embodiment, the assembly of the balancing member and the tube is suspended relative to the housing by resilient means such that it can rotate about an axis of rotation that is at least substantially parallel to or coincides with the excitation axis of the tube.

In a further preferred embodiment, the tube ends merge into a feed tube and a discharge tube beyond the tube fixation means, which feed tube and discharge tube are fixedly connected to a feed block and a discharge block, respectively, said feed and discharge blocks constituting the sole resilient means. This construction is possible if the tube is comparatively thick. If the tube is comparatively thin, however, a preferred embodiment is characterized in that the resilient means are formed by an elastic hinge formed from plate material which connects either the balancing member or the tube fixation means to the housing.

Preferably, the natural frequency of the balancing member (and of the Coriolis tube) is substantially lower than the excitation frequency. This leads to an even better vibration insulation (vibrations are transmitted with attenuation). To realize this, it is advantageous if the balancing member has a mass inertia relative to said axis of rotation that is substantially greater (in particular a number of times greater) than that of the Coriolis tube.

The detection of tube displacements may take place between the tube and the housing or between different parts of the tube. The principle of the invention, however, is particularly suitable for application in combination with a detection of displacements of the tube within the 'resilient environment', i.e. between the tube and the tube fixation means. This also reduces the sensitivity to external vibrations. A preferred embodiment of the invention is for this purpose characterized in that the detection means comprise at least two optical detectors which are arranged next to one another on one of the two constituent parts of the fixation means adjacent to a portion of the tube.

The invention further provides an embodiment which is characterized in that comprises an actuator block which has two mutually resiliently arranged portions between which a single actuator is arranged to move the portions relative to one another, the first one of these portions being connected to the balancing member, and the second one being connected to the tube fixation member.

The use of a single actuator serves to avoid a difference in actuation force that may occur with two actuators, so that no undesirable disturbances will occur in the tube movements that could be mistaken for tube movements caused by media flowing through the tube.

BRIEF DESCRIPTION OF THE DRAWINGS

A few embodiments of the invention will now be described in more detail with reference to the drawings. Identical parts have been given the same reference numerals in the Figures.

DETAILED DESCRIPTION OF THE PREFERRED EMBODIMENTS

Figure 1:
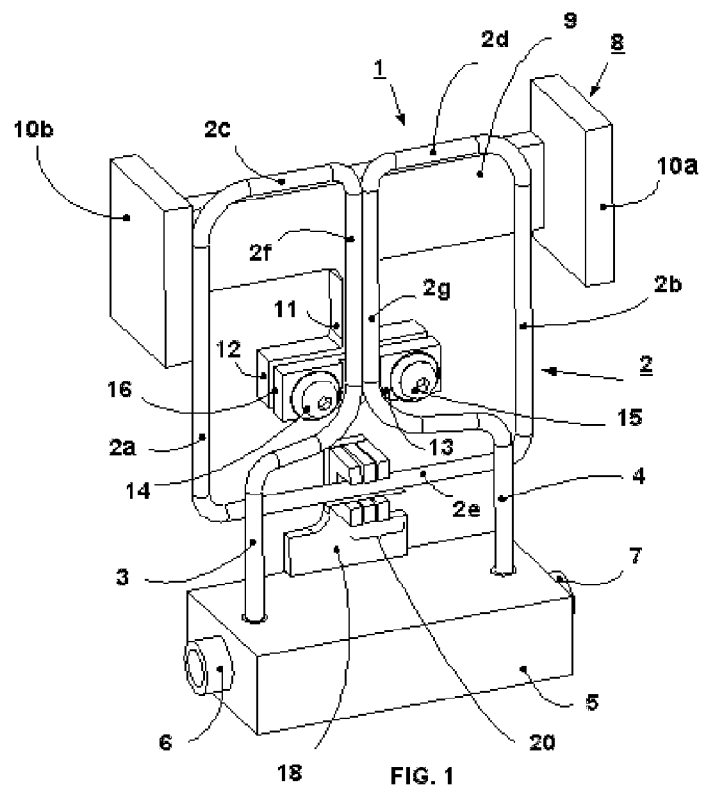
FIG. 1 is a diagram of a first embodiment of a Coriolis flow sensor with a Coriolis tube according to the invention.

FIG. 1 shows an embodiment of a flow sensor 1 of the Coriolis type with a loop-shaped Coriolis (or sensing) tube 2 bent into a rectangle which follows a substantially closed path (forms a substantially full turn). The loop-shaped flow (or sensing) tube 2 in this embodiment comprises two parallel lateral tube portions 2a, 2b which at one end are connected to a first transverse tube portion 2e and at the other end to two second tube portions 2c, 2d. The latter are connected to a feed tube portion 2f and to a discharge tube portion 2g, respectively, at the area where they come together, said portions 2f and 2g lying close together on either side of and symmetrically with respect to the main axis of symmetry of the tube 2. The loop 2 and the feed and discharge tube portions 2f, 2g preferably form part of one and the same tube. The tube portions 2f and 2g form part of a feed tube 3 and a discharge tube 4, respectively. The feed tube 3 is connected to an inlet 6 and the discharge tube 4 to an outlet 7 via a feed and discharge block 5 which is connected to the housing or forms part thereof. The feed and discharge tube portions 2f, 2g in this embodiment extend within the loop 2 and are fastened to a fixation block 13 of a tube fixation means that comprises two fixation blocks 12 and 13. The fixation block 12 is connected to a balancing member 8 via an intermediate piece 11. Said member 8 comprises a bridge piece 9 which is provided with end weights 10a and 10b at its extremities. Depending on the envisaged effect, the intermediate piece is rigid (for example comparatively thick) or flexible (for example comparatively thin). The loop 2, the feed and discharge tube portions 2f, 2g, and the feed and discharge tubes 3, 4 may advantageously be manufactured from one piece of tubing. This may be, for example, a stainless steel tube with an external diameter of approximately 0.7 mm and a wall thickness of approximately 0.1 mm.

The invention is not only suitable for smaller tube dimensions, for example external diameter below 1 to 1.5 mm, but also for tubes of larger diameter, for example 10 mm.

An essential aspect of the invention is that the assembly of the Coriolis tube and the balancing member is resiliently mounted relative to the housing. The object of this is to make any forces exerted on the housing when the tube is being excited as weak as possible. This resilience is realized in the construction of FIG. 1 in that the feed and discharge tubes 3 and 4 are constructed such that they themselves provide the desired resilient behavior. To achieve this, the tubes are comparatively thick. The construction of FIG. 1 comprises no connections between the tube 2 and the housing other than the base portions of the feed and discharge tubes 3 and 4.

If an external excitation were used, however, for example Lorentz excitation as in EP 1 719 982 A1, where an alternating current is passed through the tube and the tube is placed in the field of an external permanent magnet yoke that is fastened to the housing, then it is still possible for forces to be exerted on the housing via the magnet yoke during operation. This is prevented according to the invention in that the excitation means are provided internally, e.g. exclusively directly or indirectly at the tube fixation means. According to a first embodiment the tube fixation block for this purpose comprises two parts 12, 13 between which piezoelectric actuators 16, 17 (also denoted piezos hereinafter) are fastened. The piezos 16, 17 are clamped between the two parts 12, 13 of the fixation block by means of a bolt fastening 14, 15. Resilient means are present below each bolt head, for example in the form of one or more cup springs 28, 29 which apply a defined bias tension to the clamping construction of the piezos 16, 17. All this is shown in detail in FIG. 5. Said bias tension can be adjusted in that the bolts 14, are turned back a certain degree from the point at which the cup springs are depressed to the maximum (fully flat). As a result, the released bolt length will allow a certain stroke of the cup spring. The combination of the cup spring's stiffness and the stroke thereof provides the clamping of the piezos 16, 17 with the desired bias tension.

The fixation block thus has two parts 12, 13 of which one part 12 is formed, for example, by a milled part (which may alternatively be obtained in a casting process). This is a milled or die-cast product in which the bridge piece 9 together with the additional end weights 10a, 10b fastened thereto forms the balancing member 8. An intermediate piece 11 of this milled part is so narrow that it is flexible in a torsion direction at a certain frequency. During normal operation (at the oscillation frequency of the tube) and given such a narrow intermediate piece 11, the balancing member 8 and the loop of the Coriolis tube, i.e. portions 2a to 2e, will thus start moving in counter-phase such that the first and the second tube fixation means 12, 13 are substantially stationary in the optimum situation. The intermediate piece 11 and the tube portions 2f, 2g act as the resilient elements herein. In the case of a rigid intermediate piece 11, the entire assembly of the parts 8, 11, 12, 13 will move in counter-phase with the loop of the Coriolis tube, i.e. portions 2a to 2e, during which only the tube portions 2f, 2g act as the resilient elements. The sensor tube 2 is fastened in a recess, for example by means of a brazing process, at the other end 13 of the tube fixation means.

Figure 9:
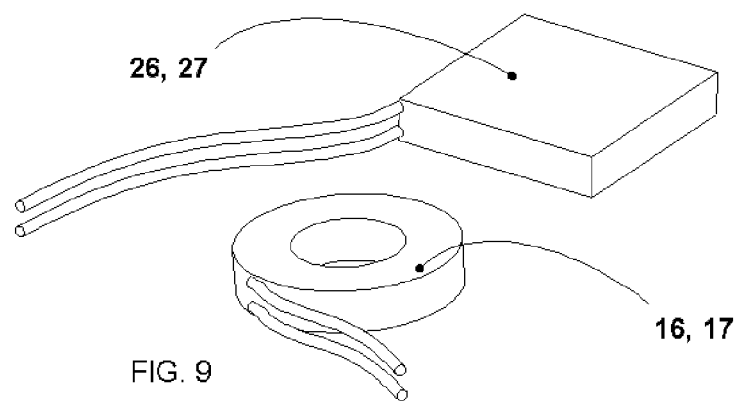
FIG. 9 shows piezoelectric actuators used in FIG. 5 and FIG. 6 in elevation.
Figure 10:
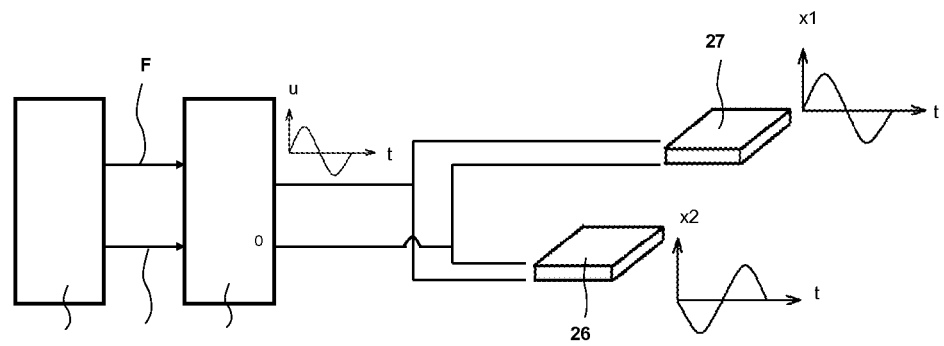
FIG. 10 shows a circuit for triggering the actuators of FIG. 9.

As is visible in FIGS. 9 and 10, the piezos 16, 17 are provided with connection wires. The piezos will expand or shrink in the direction of the clamping under the influence of a positive or negative voltage. When a sinusoidal AC voltage is applied (FIG. 10), the piezos will follow this signal by shrinking and expanding. The piezos are connected electrically in parallel but in counter-phase. As a result, the one piezo will expand at a given voltage and the other one will shrink to the same extent. The piezos each generate a force that runs counter to the bias tension of the relevant cup spring and that accordingly leads to a net displacement. Upon a shrinkage at the other side, the cup spring will compress the assembly further. The application of a sinusoidal signal to the piezos in counter-phase will cause the piezos and the construction together to perform a reciprocating torsional, i.e. pivoting movement.

The tube vibrations are measured by optical sensors. Additional electronics and firmware process and amplify the measured signals so that the Coriolis sensing tube 2 oscillates at its natural frequency. A typical voltage for the piezos is approximately 30 V. Since the tube oscillates at its natural frequency with a high Q (quality) factor of approximately 2000, the piezos account for no more than 1/Q of the amplitude. The rest of the amplitude is caused by the physical phenomenon of resonance.

Figure 6:
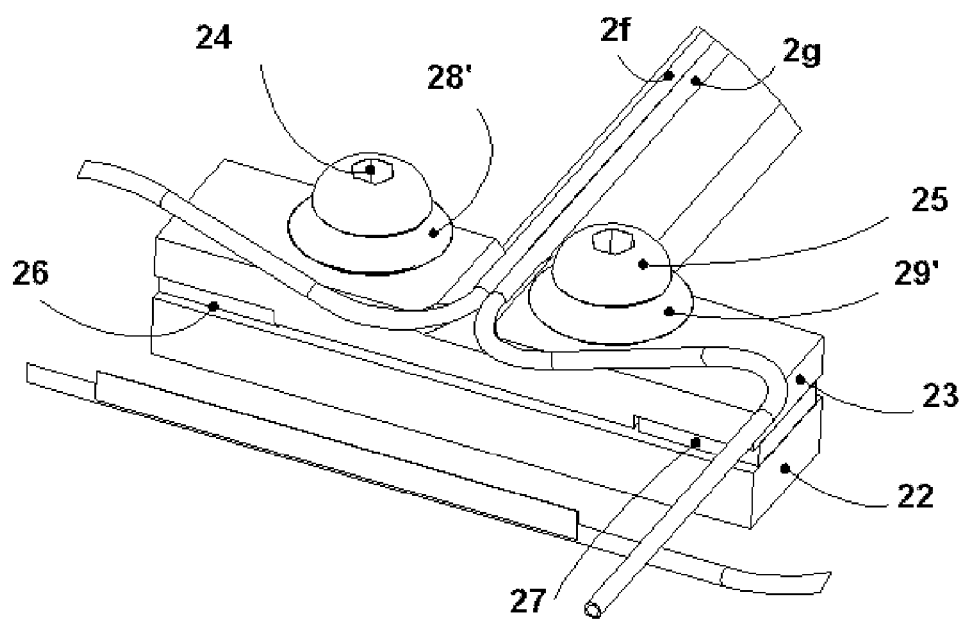
FIG. 6 and FIG. 7 are detailed views of alternative fastening methods for Coriolis tubes with two piezoelectric actuators according to the invention.

The excitation means for causing the loop-shaped tube 2 to oscillate about its main axis of symmetry (also denoted primary or excitation axis of rotation) comprise two piezoelectric actuators 16, 17 in the construction of FIG. 1. As is shown in FIG. 9, the actuators 16, 17 are annular bodies. The threaded bolts 14, 15, which are located on either side of the tube portions 2f and 2g and are symmetrical thereto, are passed through the openings in these annular bodies. As FIG. 6 shows for an alternative embodiment, the piezo actuators 26, 27 may be rectangular plates. These will then be arranged at the outer side of the bolts 24, 25 which together with (cup) springs 28', 29' exert a clamping force on the fixation sub-blocks 22, 23. FIG. 1 further shows a system of (three) optical sensors 20 which is fastened to a plate 18 that is fastened to the feed and discharge block 5, i.e. to the fixed outer world. This system of optical sensors corresponds to the system disclosed in EP 1 719 982 A1 which forms part of the present description by reference.

Figure 2:
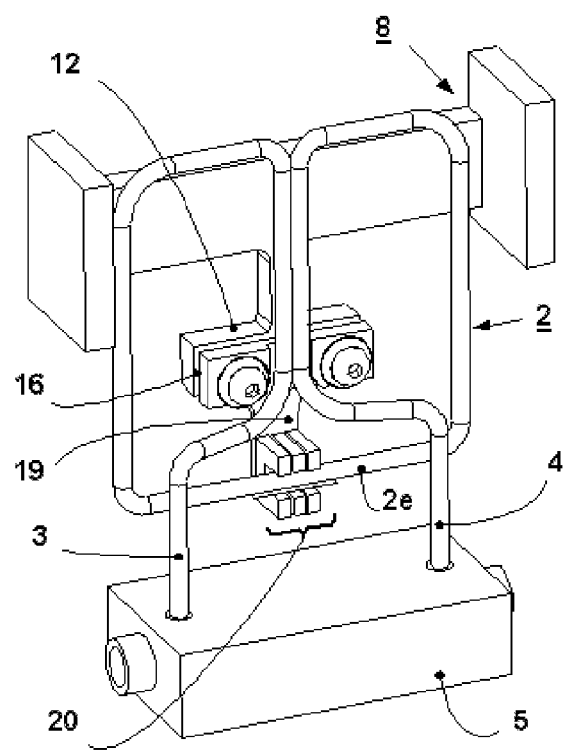
FIG. 2 diagrammatically shows a second embodiment of a Coriolis flow sensor with a Coriolis tube according to the invention.

FIG. 2 shows a more favorable embodiment, also of the so-termed box-in-a-box type, i.e. also spring-loaded exclusively via comparatively thick feed and discharge tubes 3, 4, but in this case with the system of the (three) optical sensors 20 at (a projection of) the tube fixation block 12 (the fixation sub-means that is connected to the balancing member 8 or forms part thereof). The system is located in the vicinity of tube portion 2e of the Coriolis sensing tube 2 with two optical sensors lying next to one another symmetrically relative to the excitation axis. The third optical sensor may serve for correction purposes. It is, however, also practicable to fasten the system of optical sensors 20 to the tube fixation block 13 (the fixation sub-means to which the Coriolis tube is attached). This is because the relative movement between the first and the second fixation sub-means is much smaller than the movements of the tube owing to the resonance of the tube.

Figure 3:
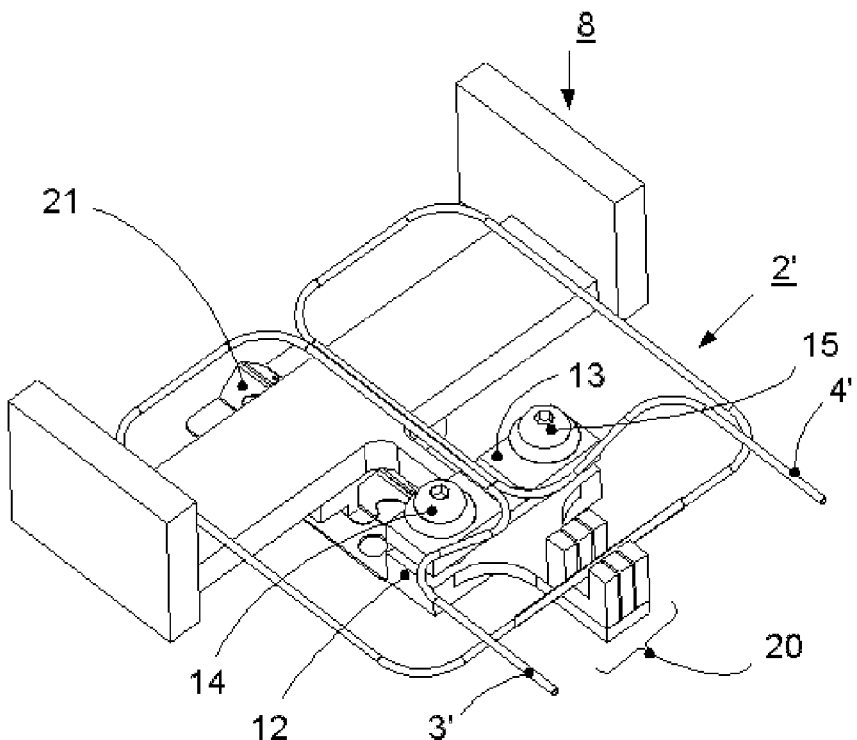
FIG. 3 diagrammatically shows a third embodiment of a Coriolis flow sensor with a Coriolis tube according to the invention.

FIG. 3 shows a flow sensor embodiment according to the invention wherein the assembly of the Coriolis tube 2 and the balancing member 8 are spring-loaded by a resilient means 21 fastened to the balancing member 8. This resilient means 21 (also denoted roof spring on account of its shape) will be described with reference to FIG. 11. The system 20 of (three) optical sensors is fixed to the tube fixation means, not to the housing. The optical sensors may be fastened to the housing (as in the construction of FIG. 1), if so desired, which is constructionally easier, but less appropriate in principle.

Figure 4:
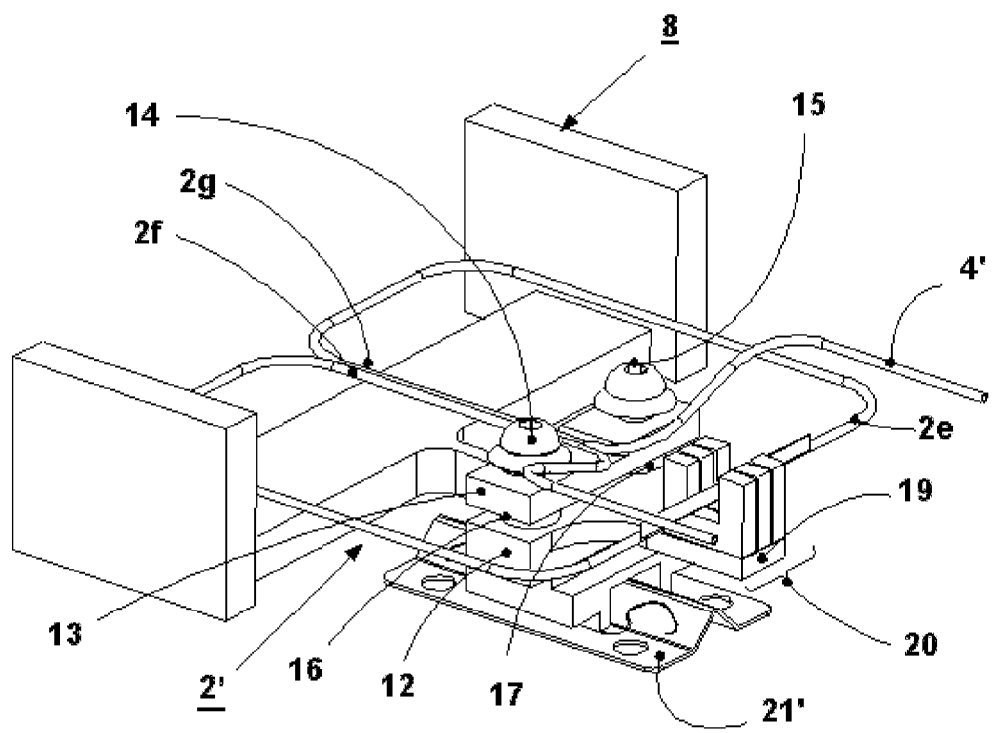
FIG. 4 diagrammatically shows a fourth embodiment of a Coriolis flow sensor with a Coriolis tube according to the invention.

FIG. 4 shows a flow sensor arrangement according to the invention wherein the resilience of the assembly of the Coriolis tube 2 and the balancing member 8 is obtained via a spring means 21' fastened to the tube fixation means. This construction has a better vibration-insulating effect than that of FIG. 3. Two discs of piezoelectric material 16, 17 (annular in shape in this case) are inserted between the tube fixation block 13, to which the Coriolis tube 2' is fastened, and the end of the tail piece of the balancing member 8. Also shown is a system 20 of (three) optical sensors (U-shaped blocks) fastened to that same end of the tail piece. Connection wires of the piezos 16, 17 have not been shown as they would have rendered the Figure less clear.

Figure 5:
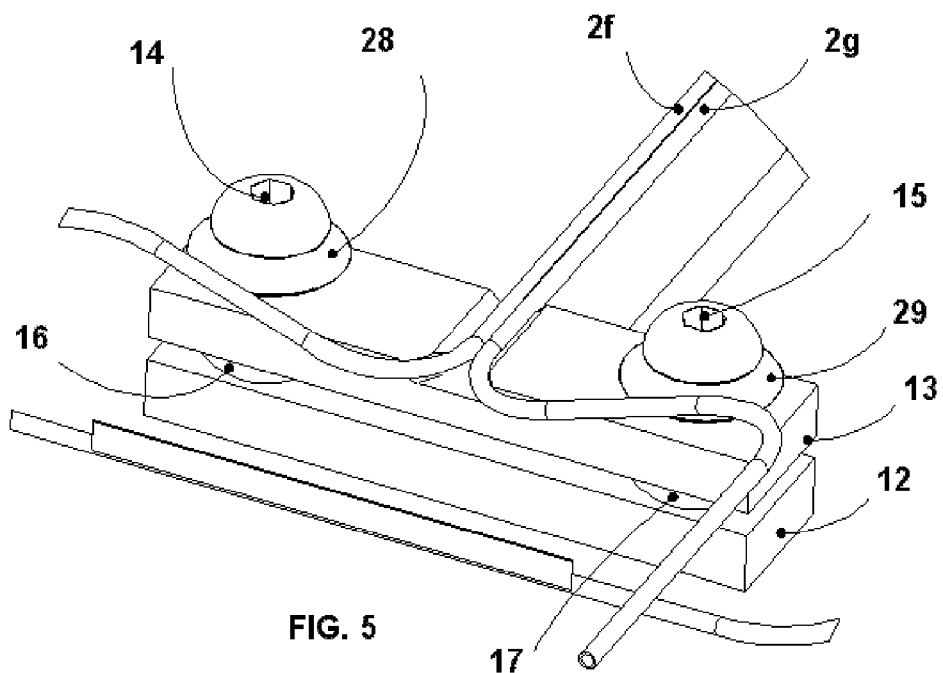
FIG. 5 shows the fastening of the Coriolis tube and its two piezoelectric actuators of FIG. 1 in detail.

FIG. 5 shows in detail the embodiment of FIGS. 1, 2, 3, and 4 of a fixation means 12, 13 with piezo excitation by two annular piezos 16, 17 arranged around fastening bolts 14, 15. Only the lateral sides of the two piezo rings 16, 17 are visible in the Figure.

FIG. 6 shows in detail an embodiment with piezo excitation by two rectangular piezos 26, 27 arranged outside the fastening bolts. Only the lateral sides of the two piezo 'tiles' are visible in the Figure.

Figure 7:
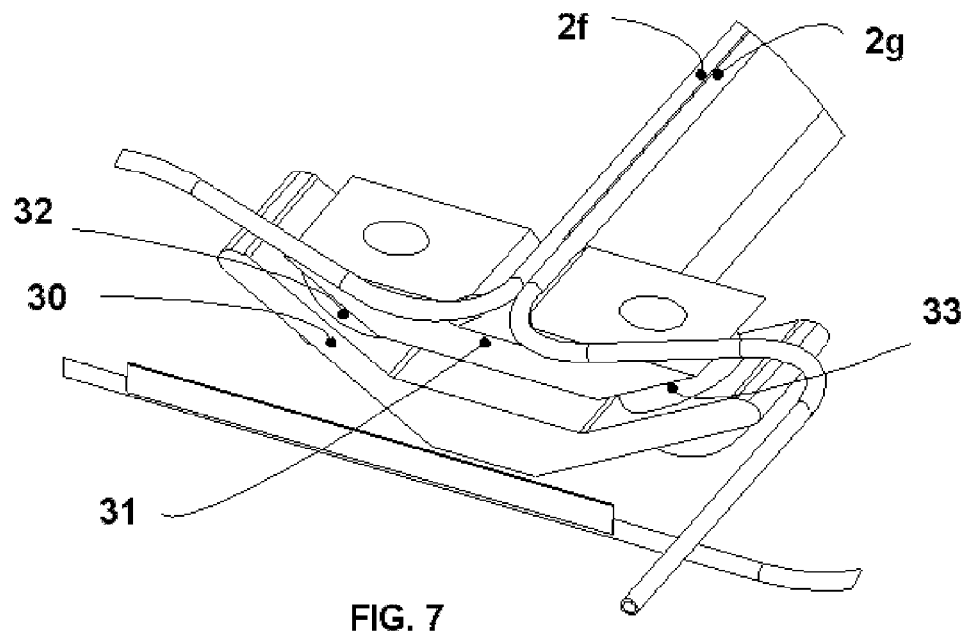

FIG. 7 shows in detail an embodiment with annular piezos 32, 33, which piezos are not in one plane but are mounted obliquely. This may also be constructed with rectangular piezos.

Figure 8:
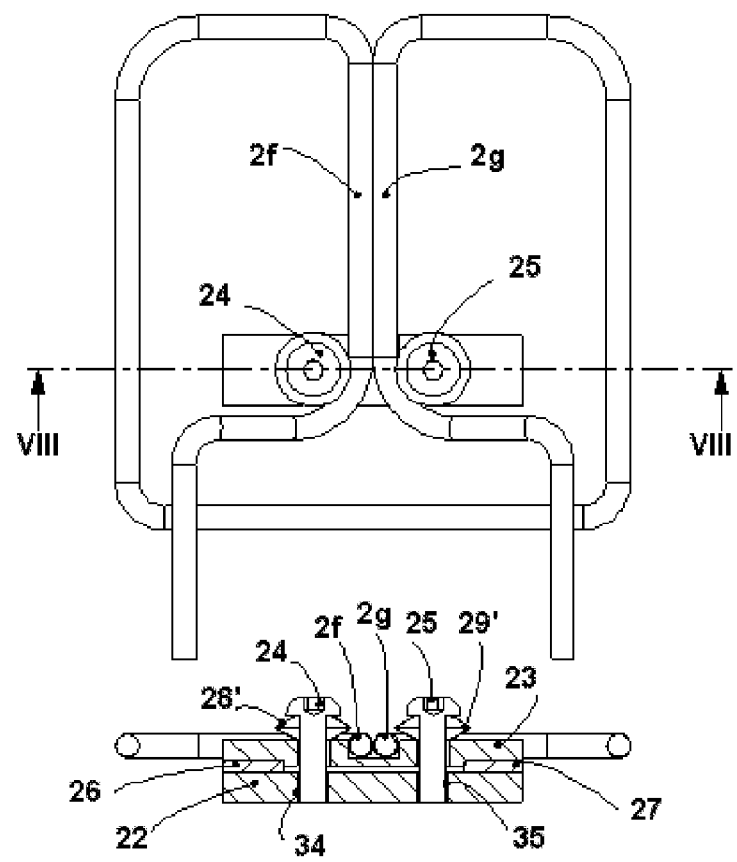
FIG. 8 shows the Coriolis tube of a Coriolis flow sensor according to the invention in plan view and in cross-section.

FIG. 8 shows an embodiment similar to that of FIG. 5, but here the threaded joint by means of which the bias tension springs for the piezos can be adjusted is fully visible. In the cross-sectional view taken through the center of the tube fixation means, two stacks 28', 29' of cup springs are clearly visible (in fact, twice two cup springs placed one inverted on top of the other), held between the bolt heads 24 and 25 and the fixation block 23. The cross-sectional view also shows two piezos 26, 27 located outside the bolts 24, 25 in recesses of the fixation block 23 as well as the fixation block 22 which forms as it were the end of the tail piece of the balancing member. The fixation block 22 in this case is provided with bores having an internal thread 34, 35 into which the threaded bolts 24, 25 can be screwed. In an alternative embodiment, the bolts are screwed in from below and the cup springs are also present there. In a mixed version, the bores in the fixation block do not have a screw-thread, but bolts with threaded ends are used onto which nuts can be turned on top of the cup springs.

FIG. 9 shows on an enlarged scale two different shapes for piezo actuators: rectangular (26, 27) and annular (16, 17). The rectangular ones are more suitable for use in small sensors, the annular ones for use in larger sensors.

FIG. 10 is a diagram showing the connection of the piezo actuators 26, 27. A device 35 provides a phase locked loop algorithm from which setpoints for the frequency and the amplitude of the output signal are derived. The output signal is amplified in an amplifier 36. The latter provides two signals in counter-phase with which the actuators 26 and 27 are controlled.

The embodiment of the resilient means 21, 21' shown in FIGS. 3 and 4 is a so-termed folded elastic hinge: a flanged resilient plate with integrated abutments. In this embodiment, two torsion spring elements and abutments in all three orthogonal directions have been combined into a single component: a flanged metal plate of resilient material. This is shown more clearly in FIG. 11.

Figure 11:
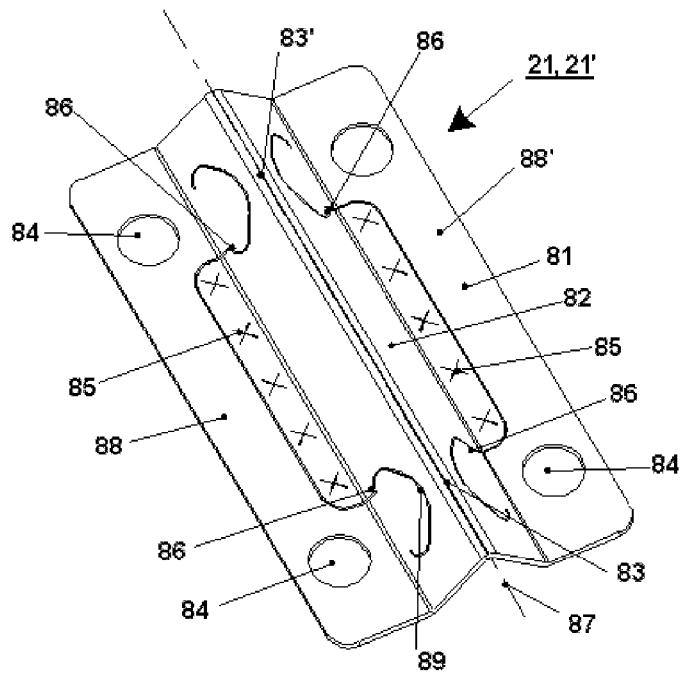
FIG. 11 shows a resilient element of the type used in the Coriolis flow sensors of FIGS. 3 and 4.

FIG. 11 shows a resilient means 21, 21' in the form of a rectangular plate of resilient material, such as spring steel, from which a fixed portion 81 (base plate) and within the latter a movable portion 82 (carrier plate) are formed in that two incisions are made, which incisions extend partly longitudinally and partly transversely thereto and are symmetrical relative to the longitudinal axis. The plate is bent along a folding line 87 and the lateral portions 88, 88' are folded back so as to lie in one plane in this case. The pairs of mutually facing incisions define resilient bridges 83, 83' which interconnect the fixed and the movable portion adjacent the ends of the folding line 87. Alternative constructions may have lateral edges which do not lie in one plane or lateral edges which have not been folded back. The base plate may also be folded along two lines instead of one, such that a planar surface is present between the flanged sides. The base plate is fastened to the housing, for example by its lateral edges. The incisions delimiting each bridge each account for approximately half the edge of a hole. What remains serves as an abutment. The holes may be, for example, round, oval or elongate. Two of these holes form an elastic hinge with integrated abutments. Furthermore, it is a folded hinge, wherein the fold achieves that the construction is rigid in two translation directions (located in a plane transverse to the folding line 87 that defines the axis of rotation) instead of one, and the integrated abutments are also active in these two translation directions. The axis of rotation of the construction thus formed lies approximately in the tip of the folding line 87 of the plate. The slits 89 formed by the incisions (four in number) define the maximum possible movement amplitude between the fixed and the moving portion. The relative movement is greatest at the points 86: an abutment is created in two directions for each of the four points 86 in that the path of the relevant incision is made to curve back here. Holes 84 arranged in the lateral edges 88, 88' serve for fastening the fixed portion 81 in the housing of a flow sensor by means of bolts. An alternative fastening instead of bolts is, for example, spot welding. A balancing member is fastened to the movable portion in the points 85, the crosses representing spot welds here. The metal plate with the incisions therein as shown may be manufactured by laser cutting or etching and subsequently be folded in an angle bending machine or some other bending tool.

Figure 12:
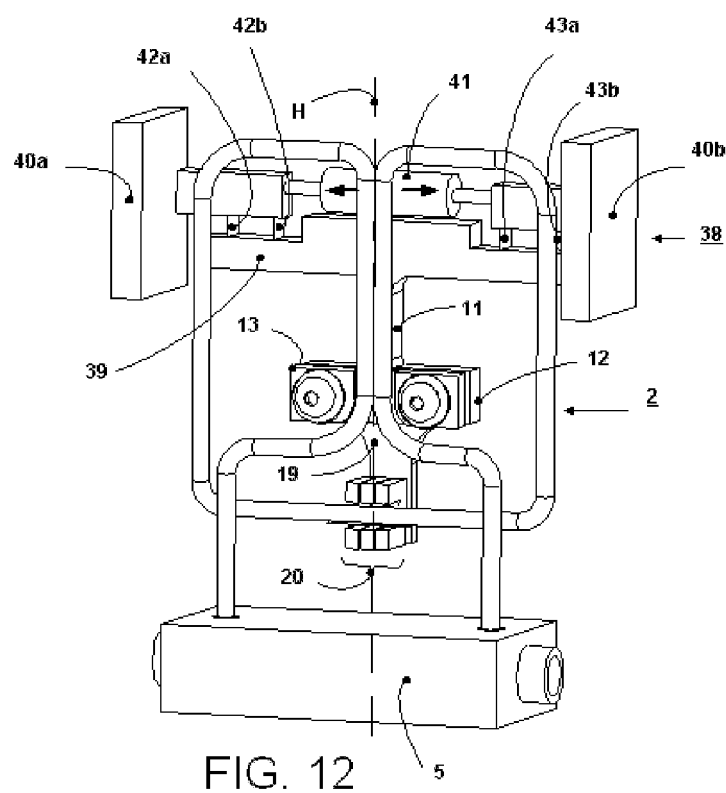
FIG. 12 shows a Coriolis flow tube with a balancing member having an adjustable mass inertia.

FIG. 12 shows a Coriolis tube 2 that is resiliently positioned on a feed and discharge block 5. The tube 2 is fastened to a fixation block 12 which is connected via a fixation block 13 and an intermediate piece 11 to a balancing member 38. The balancing member comprises a connecting or bridge piece 39 which is provided with end weights 40a and 40b at its extremities. The natural frequency of the tube 2 varies with the density of the medium. The inventors have recognized that the resilient elements of the balancing member and of the tube should be mutually attuned such that the natural frequencies are equal as much as possible relative to the tube fixation element. This is desirable for generating minimum vibrations towards the housing for all possible densities of the medium in the tube. It is possible to adapt the natural frequency of the balancing member 38 in that either the mass inertia thereof is adjusted or the rigidity with which the balancing member is fastened to its surroundings.

FIG. 12 shows an embodiment of the adaptation of the mass inertia by means of an adjustment tool; in this case an adjustment motor 41 that is connected to two threaded spindles. When the motor 41 is energized, the two ends weights 40a, 40b can be shifted symmetrically relative to the centerline H of the bridge piece 39. Two parallel blade springs 42a, 42b and 43a, 43b are shown for each side, which springs provide support in the one degree of freedom as well as guiding in the other degrees of freedom. This guiding, however, may also be provided in an alternative manner such as by ball or plain bearings. An alternative is that it is not the mass inertia that is adapted, but the rigidity with which the balancing member is fastened to its surroundings. This is the sum of the rigidity of the intermediate piece 11 and that of the resilient means in the case in which the assembly of the tube 2 and the balancing member is suspended from the housing by means of a resilient means (roof spring) fastened to the balancing member (cf. FIG. 3).

A method of providing the desired adjustment in this case comprises changing the geometry of the lever of a resilient element of the construction (the intermediate piece or the roof spring) by means of an adjustment motor. The adjustment possibilities described above also require a control mechanism (not shown). Various embodiments thereof are conceivable. The simplest one is to measure the movements (with a movement sensor at the tube fixation block, or with the optical sensors) and to adjust them to zero. An alternative is to use the natural frequency known from the processing together with a previously determined relation so as to perform a correction.

Figure 13:
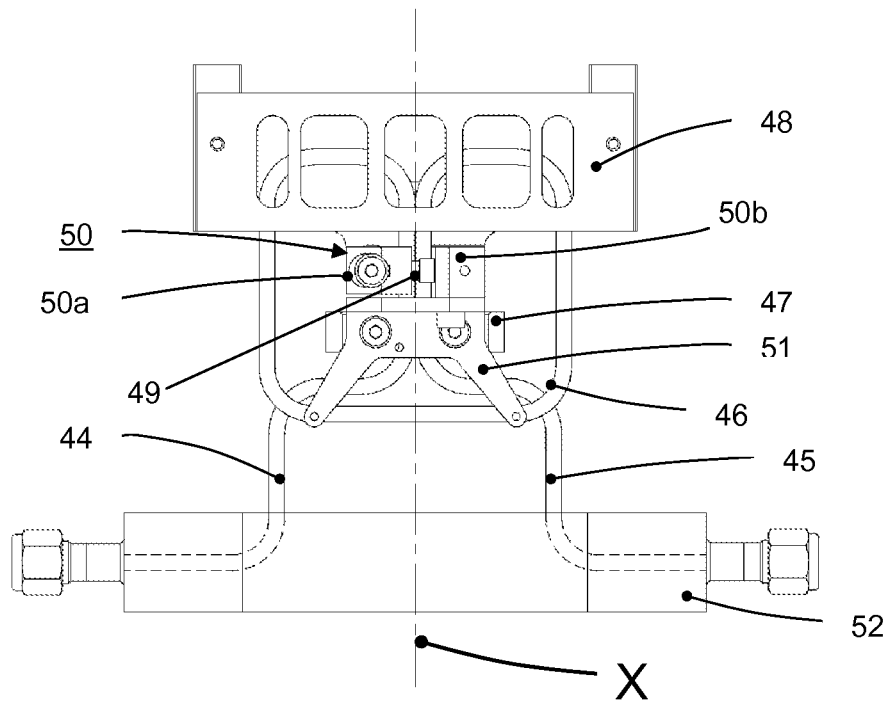
FIGS. 13, 14 and 16 diagrammatically show different elevations of an embodiment of a Coriolis flowsensor with a Coriolis tube with single piëzo actuation.

FIG. 13 diagrammatically shows a flow sensor embodiment with a Coriolis tube 46 in front elevation. The tube 46 in this case has the shape of a continuous double loop with an inlet end and an outlet end and is characterized by the so-termed box-in-a-box principle. This means that the suspension and resilience of the Coriolis tube 46 are realized exclusively by means of the comparatively thick feed and discharge tubes, 44 and 45 in this case, as in the embodiment of FIGS. 1 and 2, while the displacement of the Coriolis tube 46 and the tube fixation block 47 takes place relative to a balancing member 48. The balancing member 48 is of the type shown in the preceding embodiments, i.e. it comprises a bridge piece with a weight at either end. In the present case, the bridge piece consists of two plate parts of which one is shown in FIG. 13. The relevant displacement is imposed by a single piezo actuator 49 which causes the mutually resiliently arranged portions 50a, 50b of the actuator block 50 (shown in more detail in FIG. 15) to move relative to one another in the construction of FIG. 13. The actuation direction of the actuator is chosen to be perpendicular to the possible directions of movement of the tube. The use of a single actuator 49 serves to avoid a difference in actuation force that may occur with two actuators, so that no undesirable disturbances will occur in the tube movements that could be mistaken for tube movements caused by media flowing through the tube. The tube 46 has two parallel tube portions, i.e. the outer tubes, and two central vertical tube portions, i.e. the middle tubes, interconnected by respective transverse tubes.

The deformation of the piezoelectric element of the piezo actuator 49 will cause the portions 50a, 50b of the actuator block 50 to move relative to one another (however, an alternative actuation principle achieving the same effect may be used instead of this piezoelectric drive, for example an electro-mechanic principle). Block portion 50a is connected to the balancing mass 48 and block portion 50b to the two central vertical portions (the middle tubes) of the Coriolis tube 46 via the tube fixation block 47. Since the actuator block portions 50a, 50b are interconnected by an elastic hinge (50c in FIG. 15), the tube will start rotating about its excitation axis X in counter-phase with the balancing member 48 under the influence of the applied actuation. The object of this is, which is essential for the operation of the instrument, that the entire assembly of actuator block and fixation block during actuation is stationary with respect to the material world outside the instrument. FIG. 13 further shows a frame 51 by means of which sensors are connected to the actuator block portion 50b such that deformations of the tube caused by a medium flowing through the tube can be detected. (Compare the construction of FIG. 2) The entire assembly is connected to a connection block 52 via the feed and discharge tubes 44, 45.

Figure 14:
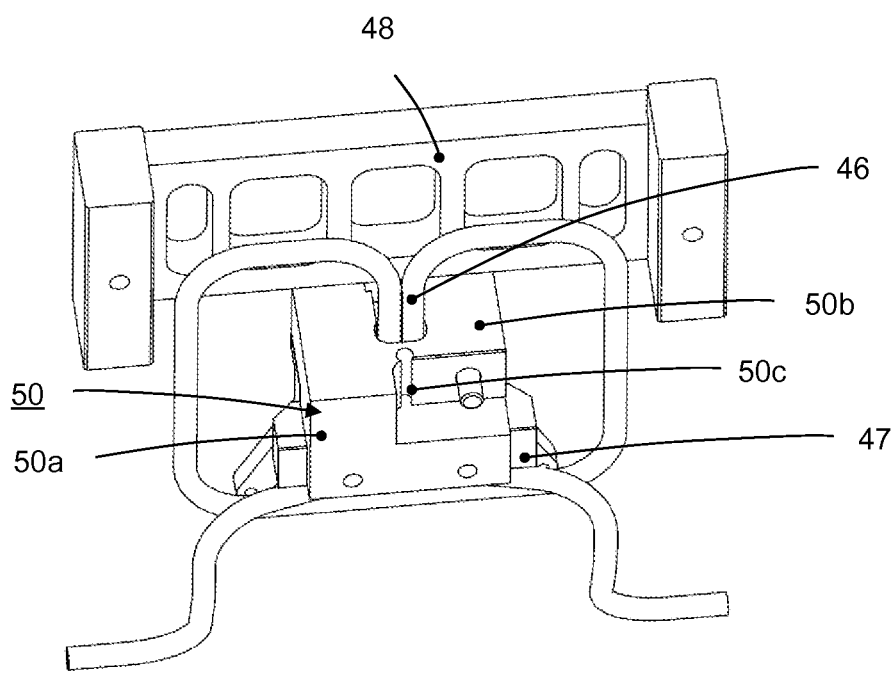

FIG. 14 is a perspective rear view of the flow sensor of FIG. 13. It is visible herein how the two portions 50a, 50b of the actuator block 50 are flexibly interconnected by means of a recessed hinge 50c. The portion 50a of the actuator block 50 is fastened to a tube fixation block 47 which in its turn is fixed to the two central vertical portions (middle tubes) of the tube 46. The other portion 50b of the actuator block 50 is connected to the balancing mass 48. When the two portions 50a and 50b move, the tube 46 and the balancing mass 48 will rotate in counter-phase relative to one another about a common point.

Figure 15:
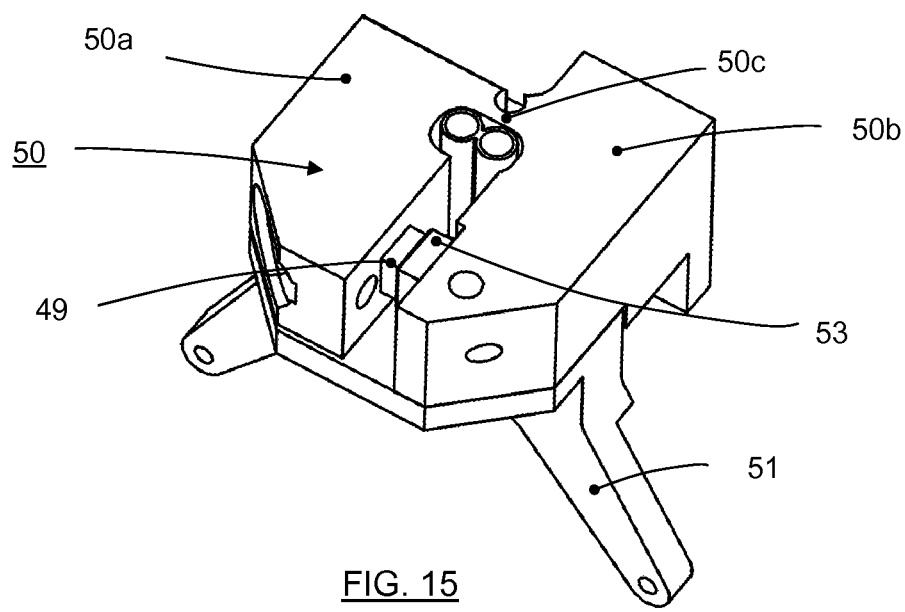
FIG. 15 shows a perspective view of a part of the flowsensor of FIGS. 13, 14, 16, said part surrounding the tube.

FIG. 15 is a more detailed view of the actuator block 50 as used in the embodiment of FIGS. 13 and 14 for causing the tube and the balancing member to rotate in counter-phase relative to one another. It is apparent how the two actuator block portions 50a and 50b are interconnected via the recessed elastic hinge 50c, with the piezo element 49 arranged between the ends of these actuator block portions. A filler block 53 serves to fill up the space between the actuator block portions 50a, 50b and the piezo 49. Preferably, a tensioning device may be provided in both legs of the actuator block portions 50a, 50b adjacent the piezo 49, for performing in principle the same function as the bias tensioning device in the embodiment with a double piezo as shown in FIG. 6, a such tensioning device extending parallel to the actuation direction of the piezo 49. A sensor support frame 51 is present which is connected to the actuator block portion 50b.

Figure 16:
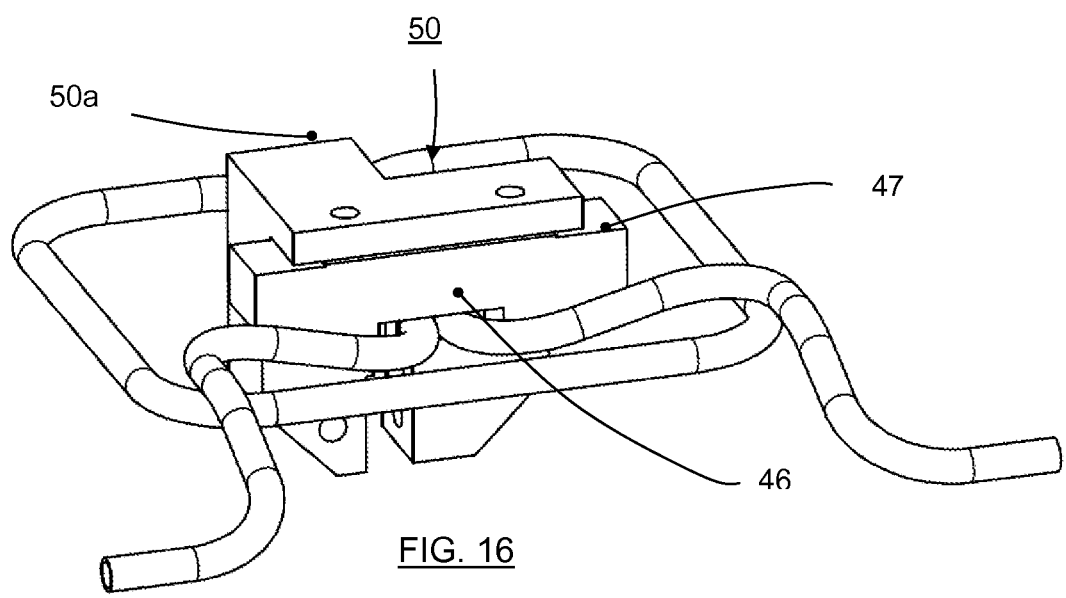

FIG. 16 is a perspective view of the lower side of the flow sensor assembly of FIGS. 13 and 14. It is visible herein how the actuator block portion 50a of the actuator block 50 is connected to the tube fixation block 47, the latter being fastened to the central vertical portions (middle tubes) of the tube 46.

Summarizing, the invention relates to a Coriolis flow sensor comprising a Coriolis tube mounted in a housing with two ends lying next to one another, said ends being fixed in a fixation means, while the portion of the tube located between said ends lies free from the housing, which flow sensor comprises excitation means for causing the tube to oscillate about an excitation axis as well as detection means for detecting displacements of portions of the tube during operation. The tube fixation means is connected to a balancing member, the assembly of the balancing member and the tube being resiliently arranged with respect to the housing, while the excitation means are "internal" and are connected directly or indirectly to the tube fixation means. As a result, during excitation the tube will rotate about the excitation axis in counter-phase with the balancing member.

The invention claimed is:

1. A Coriolis flow sensor, comprising:
   a loop shaped Coriolis tube mounted in a housing with two ends lying next to one another, said ends being fixed in a tube fixation means, while the portion of the tube located between said ends lies free from the housing;
   excitation means for causing the tube to oscillate about an excitation axis; and
   detection means for detecting displacements of portions of the tube during operation,
   wherein the tube through the tube fixation means is connected to a balancing member, the balancing member and the tube fixation means being connected to one another via a flexible intermediate piece, an assembly of the balancing member and the tube being resiliently arranged with respect to the housing, the excitation means being configured to rotate the tube about the excitation axis in counter-phase with the balancing member.

2. The Coriolis flow sensor as claimed in claim 1, wherein the tube fixation means comprises a first and a second fixation sub-means, said first fixation sub-means being connected to the balancing member while the tube ends are fixed in said second fixation sub-means, which fixation sub-means are moveably interconnected, and
   the excitation means are designed for causing the second fixation sub-means to pivot relative to the first fixation sub-means about the excitation axis.

3. The Coriolis flow sensor as claimed in claim 2, wherein the excitation means comprise a first and a second piezoelectric actuator, which actuators are provided on either side of a plane through the excitation axis between mutually opposing surfaces of the first and the second fixation sub-means.

4. The Coriolis flow sensor as claimed in claim 2, wherein the tube fixation means comprises means for keeping the first and the second fixation sub-means at a small distance from one another under an adjustable bias tension.

5. The Coriolis flow sensor as claimed in claim 3, wherein the first and the second piezoelectric actuator are connected to a trigger device so as to be controlled by respective sinusoidal signals in counter-phase.

6. The Coriolis flow sensor as claimed in claim 1, wherein the assembly of the balancing member and the tube is suspended relative to the housing by resilient means such that said assembly can rotate about an axis of rotation that is at least substantially parallel to or coincides with the excitation axis of the tube.

7. The Coriolis flow sensor as claimed in claim 1, wherein the tube ends merge into a feed tube and a discharge tube beyond the tube fixation means, which feed tube and discharge tube are fixedly connected to a feed block and a discharge block, respectively, said feed and discharge blocks constituting the sole resilient means.

8. The Coriolis flow sensor as claimed in claim 6, wherein the resilient means are formed by an elastic hinge formed from plate material which connects either the balancing member or the tube fixation means to the housing.

9. The Coriolis flow sensor as claimed in claim 8, wherein the elastic hinge comprises a base plate of resilient metal which is fixedly connected to the housing and which has a central opening, a carrier plate and torsion spring means extend within said opening and are formed from the material of the base plate by means of incisions provided in the base plate, the torsion springs having the shape of elongate strips which constitute the sole connection between the carrier plate and the base plate, the carrier plate being suspended in the opening of the base plate by means of said elongate strips.

10. The Coriolis flow sensor as claimed in claim 2, wherein the detection means comprise at least two optical detectors which are arranged next to one another on one of the fixation sub-means adjacent a portion of the tube.

11. The Coriolis flow sensor as claimed in claim 1, wherein the balancing member comprises a bridge piece with two extremities each bearing an end weight and is arranged transversely to and with a center of gravity on the axis about which the balancing member can rotate.

12. The Coriolis flow sensor as claimed in claim 11, wherein an adjustment device is provided on the bridge piece such that the end weights can be shifted symmetrically relative to the centerline of the balancing member.

13. The Coriolis flow sensor as claimed in claim 1, further comprising an actuator block which has two mutually resiliently arranged portions between which a single actuator is arranged to move the portions relative to one another, the first one of these portions being connected to the balancing member, and the second one being connected to the tube fixation member.

14. The Coriolis flow sensor as claimed in claim 13, wherein the two portions of the actuator block are flexibly interconnected by means of an elastic hinge.

* * * * *